United States Patent [19]

Chen

[11] Patent Number: 4,783,713
[45] Date of Patent: Nov. 8, 1988

[54] FULL AUTOMATIC ELECTRIC SHOCK PROTECTOR APPARATUS

[76] Inventor: Cezhan Chen, Room 305, 116 Qu Qi Road, Shanghai, China

[21] Appl. No.: 22,976

[22] Filed: Mar. 6, 1987

[30] Foreign Application Priority Data

Aug. 29, 1986 [CN] China .................... 86105323

[51] Int. Cl.⁴ .............. H02H 5/12; H02H 3/52
[52] U.S. Cl. ............................. 361/48; 361/44; 361/45; 361/50
[58] Field of Search ............. 361/42, 44, 45, 46, 361/47, 48, 49, 50

[56] References Cited

U.S. PATENT DOCUMENTS

| | | | |
|---|---|---|---|
| 3,700,966 | 10/1972 | Morrow | 361/49 |
| 3,891,895 | 6/1975 | Wittlinger | 361/45 |
| 3,938,006 | 2/1976 | Gadwal et al. | 361/48 |
| 4,080,640 | 3/1978 | Elms et al. | 361/45 |
| 4,114,089 | 9/1978 | Ahmed | 361/44 |
| 4,200,897 | 4/1980 | Dawley | 361/45 |
| 4,203,142 | 5/1980 | Lee | 361/42 |
| 4,247,879 | 1/1981 | Elms et al. | 361/45 |
| 4,441,134 | 4/1984 | Lewiner | 361/45 |

Primary Examiner—A. D. Pellinen
Assistant Examiner—H. L. Williams
Attorney, Agent, or Firm—Birch, Stewart, Kolasch & Birch

[57] ABSTRACT

An electric shock protector apparatus includes a circuit for detecting an electric shock current signal which has a frequency substantially higher than the line frequency of a power distribution system. The current of the power system is passed through a filter which eliminates the power supply frequency and produces a signal indicative of an electric shock current. The electric shock current signal is passed to positive and negative half-cycle operation signal circuits which transmit signals to a logic gate for operating a relay to disconnect the power source from the line conductors.

11 Claims, 6 Drawing Sheets

FULL AUTOMATIC ELECTRIC SHOCK PROTECTOR APPARATUS

FIELD OF THE INVENTION

The present relates to a protection apparatus, and particularly relates to a full automatic electric shock protector apparatus which can detect relative low shock current superimposed on large and changeable leakage current for protection against shock.

BACKGROUND OF THE INVENTION

As is well known, in order to present accidents due to electric shock a leakage current protector (or a safety cut-out) may be used, a leakage current protector usually comprising a current transformer, amplifier, solid state switch, relay, direct current power supply and so on. When the current occurs from an alternating current power supply to ground, the voltage across the current transformer is proportional to the leakage current. After amplification by an amplifier the voltage is fed to a solid state switch. When the leakage current to ground is increased to a rated value, the solid state switch conducts, current passes through the coil of a relay connected in series between a DC power supply and the solid state switch, and the relay operates to interrupt the AC power supply, therefore safety is assured. The current to ground for the operation of the protector may be shock current through the human body or leakage current to ground from equipment and/or conductors. Under good conditions the leakage current of power lines is generally not over about 15 ma. Therefore, in general the rated leakage operation current of a leakage protector is adopted as 30 ma. Normally the leakage protector is not operated. When an electric shock occurs, if the shock current is greater than 30 ma the leakage protector will be operated to interrupt the power supply. The operation time of the leakage protector is generally less than 0.1 second, therefore the product of the current and the time is about 3 ma sec when the human body touches a live conductor, this product is much lower than the permissible limit of 30 ma sec so that safety can be assured.

The magnitude of the leakage current of a power line depends upon the aging conditions of the conductor of the power supply, the obsoleteness of the equipment, the amount of electric equipment being used, and the humidity of the atmosphere. The magnitude of the leakage current for each phase to the ground is variable. When the weather is dry, the resultant vector value of the leakage current to the ground for a single phase or three phase system will be much greater than 15 ma due to the increase of the capacity of the load. For the rainy season in the south of China and south of the Yantze River, the humidity in the air is high, the insulation of conductors and equipment is decreased, and the leakage current is much greater. Such as in the Guangtung Province of China, etc. The leakage current of mains and equipment with 100-200 ampere load capacity is generally more than 100 ma, and the variance of the leakage current between sunny days and rainy days is great. Therefore, even if the human body does not touch a live conductor, the above-mentioned leakage protector with 30 ma rated operation value of leakage current will be operated, thus the normal work order is disturbed, and a leakage current protector or a safety cut-off with its rated operation current greater than 100 ma must be adopted. When a protector with high rated operation current is used, since the normal leakage current is great, as soon as someone touches a live conductor the protector will be operated immediately when only a small shock current is superimposed on the original great leakage current and the power supply is interrupted. The effect for protecting the human body is good, but when the weather turns dry or the amount of electric equipment used is decreased, the leakage current is decreased to a small value. If someone touches a live conductor at this time, the protector will be operated only when a great shock current is superimposed on the relatively small leakage current, thus the shock current passing through the human body may be greater than 100 ma, causing danger even death from electric shock. The protector thus has no effect on protecting humans from electric shock. In order to solve this problem, the operation current of the protector can be made adjustable. The operation current is set according to the leakage current at a certain time, but as mentioned above, the leakage current is variable so that if the operation current of the protector is set according to a small leakage current, as soon as the leakage current is increased, the protector will malfunction, i.e. the protector will be tripped even if no electric shock occurs. If the operation current is set according to a great leakage current, when the shock current is just out of phase with the leakage current, the danger of shock exists and when the leakage current is reduced, the protector will be tripped only with greatly increased shock current so that it can not provide any protection. Another practice is to distinguish the leakage current from the shock current. This technique has two methods: the first is to judge from an abrupt swing of the amplitude of current, and the second is to judge from the characteristics of the current. The first method is a pulse type protector, in which current with an abrupt swing is considered a shock current and slow change current is considered a leakage current. The value of the operation current for electric shock is the vector sum of the shock current passing through the human body and the resultant leakage current with the original leakage current subtracted. When the live conductor touched belongs to a different power phase line, the operation current is different, therefore an insensitive operation dead zone exists, and when a person gets an electric shock in thsi dead zone, the safety of the human body can not be assured by the protector and the protector can easily malfunction by another reason such as the starting of equipment. A protector which distinguishes according to the waveform of the current was disclosed in UK patent application GB No. 2019677A published on Oct. 31, 1979. This publication recognized that the waveform of shock current is a peaked wave which changes slowly in the vicinity of zero and its frequency is the same as the frequency of the power supply. Therefore, a protector apparatus is provided, the operation of the protector apparatus being determined by analyzing parameters of the shock current such as the ratio of the third harmonic component to the fundamental component, the ratio of the peak current to the average current, and the ratio of the peak value to the slope at the zero crossing, to see if the ratio is greater than the rated value for operation occurring under the relatively small shock current with relatively great leakage current. There exists, however, a big third harmonic component usually in a load such as an electric machine, thus the waveform of the resultant current of the harmonic component and the leakage current is similar to that of the shock current so that malfunction occurs easily.

SUMMARY OF THE INVENTION

In order to overcome the disadvantages above-mentioned, the object of the invention is to provide means for detecting the frequency of the waveform of the shock current to distinguish the shock current from the leakage current. Therefore a full automatic electric shock protector apparatus which operates with relatively low shock operation current under conditions of great variation of the leakage current is provided.

As is well-known, the frequency of the leakage current is the same as that of the mains, e.g. 50 Hz, but an electric shock is transient. The waveform of shock current is a non-symmetric, non-sinusoidal, and non-linear waveform. It is required for safety that a solid state switch should be put into conduction by the shock current in the first period after the electric shock starts (for the shock current, the current in a half period is positive, and the current in the other half period is negative), therefore the shock current should be analyzed from the transient. Also the impedance of the human body is non-linear, wherein the equivalent resistance, capacitance, and inductance are varied according to the voltage applied or the current passing through. The waveform of the shock current measured is analyzed with Fourier analysis or other known methods. It is found that the frequency of the waveform of the shock current is not the same as that of the frequency of the power supply and also the frequency of the shock current depends on the type of electric shock. Electric shock can be divided into two kinds, i.e. general electric shock and direct electric shock. The so-called general electric shock denotes that parts of the human body are dry, the equivalent impedance is high and the electric shock happens through a definite insulation body. After the electric shock occurs, the shock current increases gradually with the decrease of the insulation of the body. After the initial electric shock to the human body a breakdown of the cuticle of the skin i.e. an abrupt decrease to a constant vale for the impedance of the human body occurs. For the general electric shock this abrupt change process varies slowly, an the speed of the change depends on the magnitude of the impedance of the insulation body and the variation of the impedance of the human body during breakdown. If the insulation body has a big impedance, then the variation of the shock current during the breakdown of the human body is slow, at this time the main frequency of the shock current is lower than that of the power supply. For example, when the frequency of the power supply is 50 Hz, the frequency of the shock current is lower than 47 Hz. The so-called direct electric shock denotes that parts of the human body are humid, and the equivalent impedance of human body is small. At this time the cuticle of the skin of the human body is broken down by the electricity and the impedance of the human body changes into a constant value of 1 kiloohm or 0.5 kiloohm. At this time, the frequency of the main component of the shock current is greater than that of the power supply. For example, when the frequency of the power supply is 50 Hz, the frequency of the shock current is higher than 53 Hz, thus the power supply frequency leakage current can be filtered through a filter device and only the shock signal and abrupt change signal component of the leakage current remains to be processed.

Another object of the invention is to provide an electric shock protector apparatus which can produce not only a shock protection signal but also an abrupt change operatinal signal of the leakage current, thus the protection occurs when an electric shock to the human body exists and the abrupt increment is large.

A further object of the invention is to provide an electric shock protector apparatus which can also produce only a leakage protection signal, thus the electric shock protector apparatus can be operated with a low rated value of electric shock operation current and a high rated value of leakage operation current.

The full automatic electric shock protector apparatus provided by the invention comprises a movable contact means for moving said contact automatically, means for detecting the current with respect to ground passing through said contact and means for analyzing the frequency of the said current with respect to ground for discrimination when said current with respect to ground is an electric shock current, said means for analyzing detects that the frequency of the shock current is different from that of the power supply and as the amplitude of said current reaches a predetermined value, said means for moving said contact automatically operates to interrupt the power supply.

The full automatic electric shock current protector apparatus provided by the invention can separate the shock current and the leakage current effectively when the variation of the leakage current is large e.g. 0 to 200 ma. The shock operation current can be kept to less than 30 ma, the time for interrupting the power supply is less than 0.08 sec. and no insensitive dead zone exists for three phase power supply. Also, when the abrupt change of leakage current with respect to ground due to equipment and branch loads is greater than a definite value e.g. 40 to 60 ma the protection still exists. For example, when a branch or a large load is inserted, if the leakage increment is less than the definite value, the protector apparatus will not malfunction.

BRIEF DESCRIPTION OF THE DRAWINGS

The preferred embodiment of the invention will be described in detail with reference to the accompanying drawings wherein.

DESCRIPTION OF THE PREFERRED EMBODIMENTS

Figure 1:
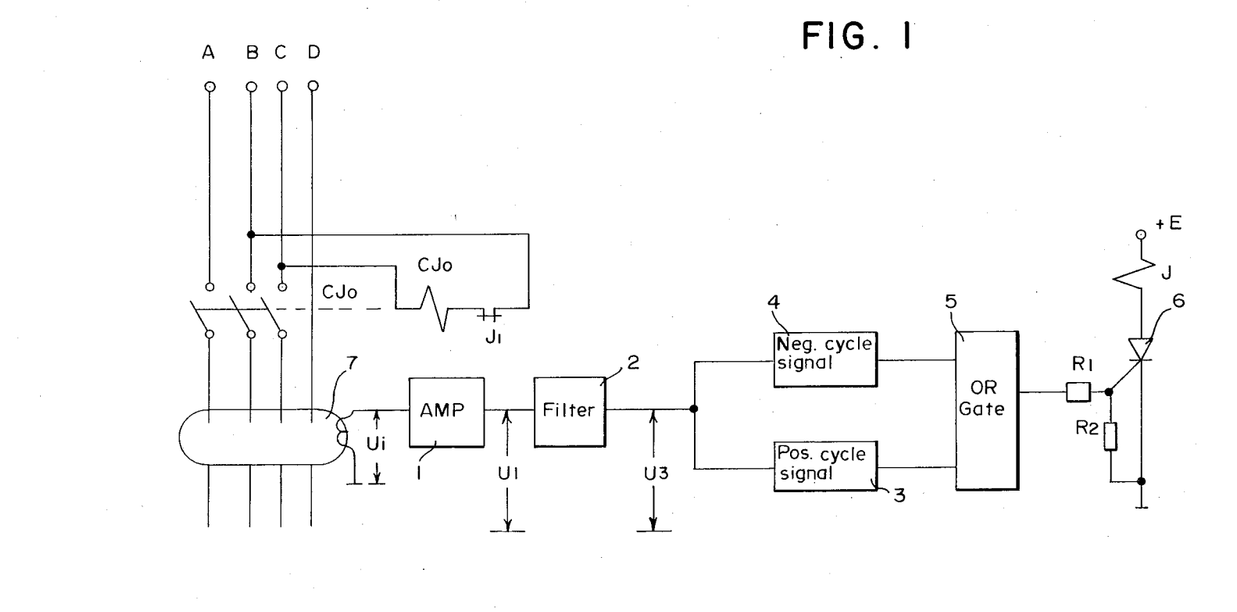
FIG. 1 shows a schematic block diagram of the invention.

Referring to FIG. 1 in the block diagram of the electric shock protector apparatus provided by the invention, 7 is a detector for detecting the current with respect to ground passing through the contact of AC circuit breaker $CJ_o$, (the contact of the $CJ_o$ is in the closed state). The detector may be a current transformer having a primary coil wound on a core and three or four conductors of the electric power are passed through when the power supply is in three phases and a phase line and a neutral line are passed through when the power supply is of single phase. Therefore, the voltage $U_1$ induced at the secondary coil would on the iron core is proportional to the current with respect to ground of the phase line at the load terminal of the power supply. The iron core may be made of a permalloy or an amorphous ferromagnetic material. The current of the phase line of the power supply with respect to the ground is generally the leakage current to ground but when the human body touches the live conductor an electric shock current is also involved. The means for analyzing the frequency of the above-mentioned current with respect to ground for discrimination comprises an amplifier 1, a filter or removing the frequency component of power supply 2, means for producing a positive half-cycle electric shock operation signal 3, means for producing a negative half-cycle electric shock operation signal 4 and an OR logic gate 5. The output signal of the current transformer 7 is amplified by the amplifier 1, so that the amplitude is increased and a voltage $U_1$ is obtained. Then $U_1$ is filtered by the power supply filter 2 and the voltage $U_3$ is obtained. Because the frequency of the leakage current is the same as that of the power supply, the leakage current is filtered out, while the frequency of the electric shock current, whether the electric shock is a direct electric shock or a general electric shock, is different from the frequency of the power supply. Therefore only the signal relevant to the electric shock current appears in the output voltage $U_3$ of the filter 2. Even if the leakage current is high, the electric shock loop of the electric shock protector apparatus does not operate. The output of the filter 2 is fed to means for producing a positive half-cycle electric shock operation signal 3 and means for producing a negative half-cycle electric shock operation signal 4 simultaneously. Their respective output signals are fed to the OR logic gate 5 respectively. Thus, either the electric shock occurs in the positive half-cycle or in the negative half-cycle. At the output of the logic gate 5 a signal may be produced and is fed to the solid state switch 6 e.g. SCR, rapidly and the switch is turned into conduction. Thus, current flows through the coil of relay J, the relay operates and its constant closed contact $J_1$ is opened. Then the coil of the AC circuit breaker $CJ_o$ is open circuited. Then the contact of the AC circuit breaker interrupts the load current. The electric shock protector apparatus according to the invention may be set to such a condition that as soon as the electric shock current reaches to e.g. 30 ma the electric shock protector apparatus operates to trip the power supply to assure safety.

Figure 2:
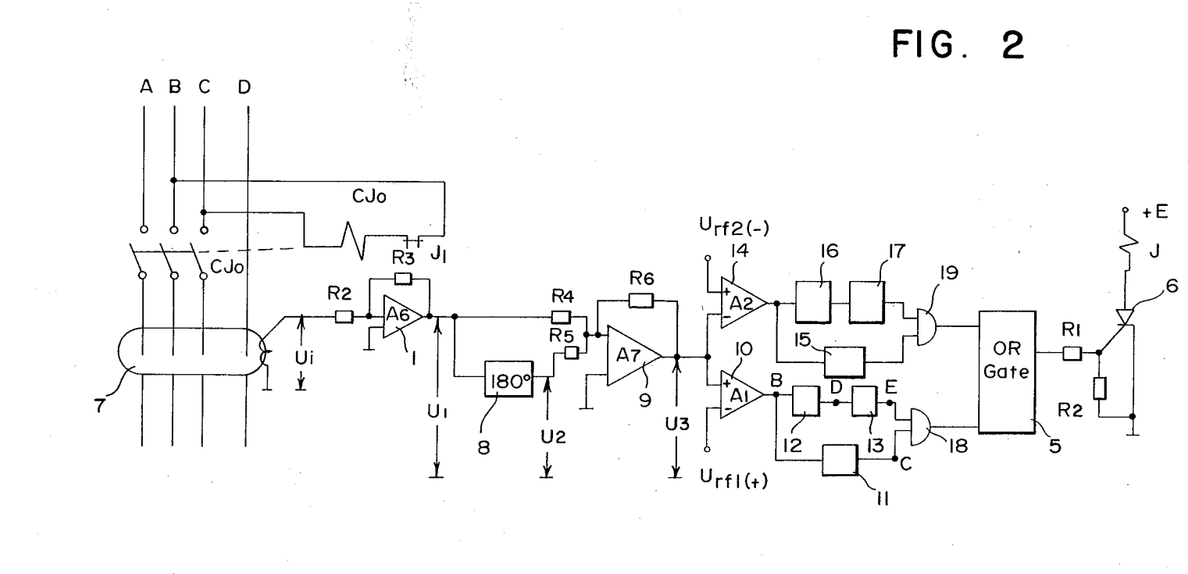
FIG. 2 shows a schematic block diagram of the first embodiment of the invention.
Figure 4:
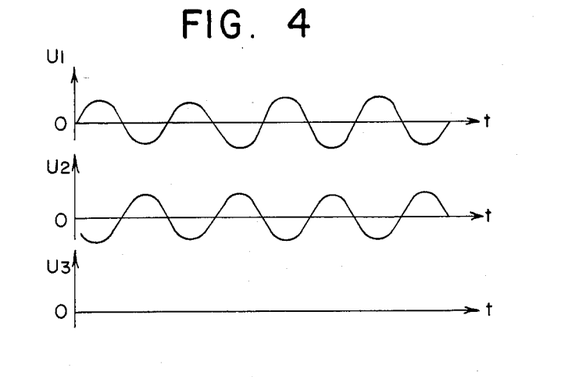
FIG. 4 shows the waveform of the leakage voltage $U_1$–$U_3$.
Figure 6:
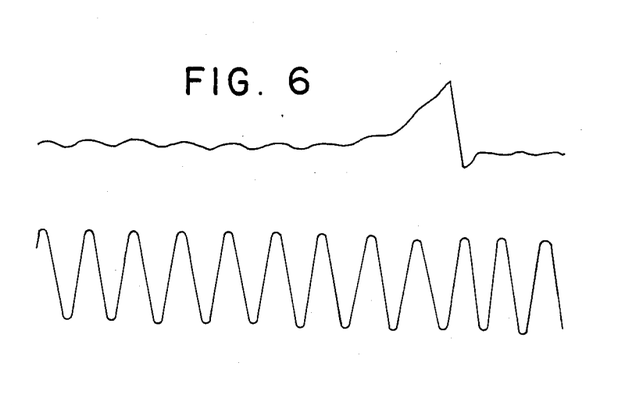
FIG. 6 shows the waveform of the electric shock current of the general electric shock.

Referring to FIG. 2., FIG. 4 and FIG. 6, in the figures the power supply filter 2 may consist of a phase-shift amplifier 8 and an adder 9. In the phase-shift amplifier 8, a phase-shift circuit and an amplifier portion are involved, the phase-shift amplifier 8 being designed such that the phase-shift of the input voltage $U_1$ having a frequency of the power supply is 180 degrees, and the magnitude of the transfer coefficient is 1. Therefore, the output voltage $U_2$ is equal to the input voltage $U_1$, but opposite in direction. The voltages $U_1$ and $U_2$ are fed to two input terminals of the adder 9, consisting of operational amplifier A7, and resistors R4, R5 and R6. After being added in the adder 9, the output voltage is $U_3$. So for input voltages with the frequency of the power supply, the output voltage $U_3$ is zero. At this time the waveforms of the voltages $U_1$, $U_2$ and $U_3$ are shown as in FIG. 4. But when $U_1$ is produced from electric shock current, because the frequency of the voltage $U_1$ is different from that of the power supply and the waveform of the voltage $U_1$ is non-symmetric and non-linear, the phase shift angle is not 180 degrees and the magnitude of the transfer coefficient is not one, so that the output voltage $U_3$ is not zero. When an electric shock occurs, (either a direct electric shock or a general electric shock) the frequency of the voltage $U_1$ is different from that of the frequency of the power supply. At this time the output voltage $U_3$ is fed to means for producing positive half-cycle electric shock operation signal 3 and means for producing negative half-cycle electric shock operation signal 4 simultaneously. The means for producing positive half-cycle electric shock operation signal 3 comprises a first comparator 10, a first differential circuit 11, a first integrator circuit 12, a first monostable trigger 13, and a first "AND" logic gate 10. The first reference voltage $U_{rf1}$ is a positive voltage. When the voltage $U_3$ is greater than $U_{rf1}$ the output of the comparator 10 is a square wave. For one branch a positive peaked pulse is obtained and fed to the first AND logic gate 10 after the differentiation of the square wave through the first differential circuit 11, while the negative pulse obtained after the differentiation is generally absorbed by a parallel-connected diode. For another branch, after the delay in the first integrator circuit 12, the square wave from the output of the first comparator 10 triggers the first monostable trigger 13. So a square wave is produced and fed to the first AND logic gate 18. The width of the square wave may be designed to be 20 ms. The first positive differential pulse produced after the differentiation appears earlier, so it does not coincide with the square wave produced by the first monostable trigger 13. Therefore the first AND logic gate 18 has no output. Only when the differential circuit 11 once again produces a second positive differential pulse during the 20 ms square wave, the first AND logic gate 18 can produce an output signal. Because the voltage $U_3$ is a disordered signal having a higher frequency than that of the power supply, when the electric shock occurs and after the comparator 10 is triggered by the voltage $U_3$ the first time, the comparator 10 will be triggered once again. The second differential pulse coincides with the square wave produced by the monostable trigger 13. A signal is output by the first AND logic gate to interrupt the power supply. When the comparator is triggered by the signal $U_3$ the first time, the electric shock operation signal does not occur, thus malfunctions produced by external pulse interference can be prevented. When the electric shock current is small, $U_3$ $U_{rf1}$, the comparator 10 has no output and the electric shock operation signal does not occur. The means for producing a negative half-cycle electric shock operation signal 4 is similar to the means for producing a positive half-cycle electric shock operation signal. Means 4 comprises a second comparator 14, a second differential circuit 15, a second integrator circuit 16, a second monostable trigger 17, and a second AND logic gate 19. The second reference voltage $U_{rf2}$ with negative polarity is connected to the positive terminal of the second comparator 14. The voltage $U_3$ is fed to the negative terminal. The second comparator 14 works when $U_3$ is negative, big in amplitude and $U_3 < U_{rf2}$, its work condition and relative waveform is similar to that in the means for producing the positive electric shock operation signal. After the two means above-mentioned are used, whether the electric shock occurs in the positive cycle or in the negative cycle, the protector is rapidly actuated. The frequency of the current for a general electric shock is lower and the rise time of the front edge is slow. When the general electric shock occurs, the work condition of the means for producing electric shock operation signal 3 and 4 is similar to that in the direct electric shock.

Figure 3:
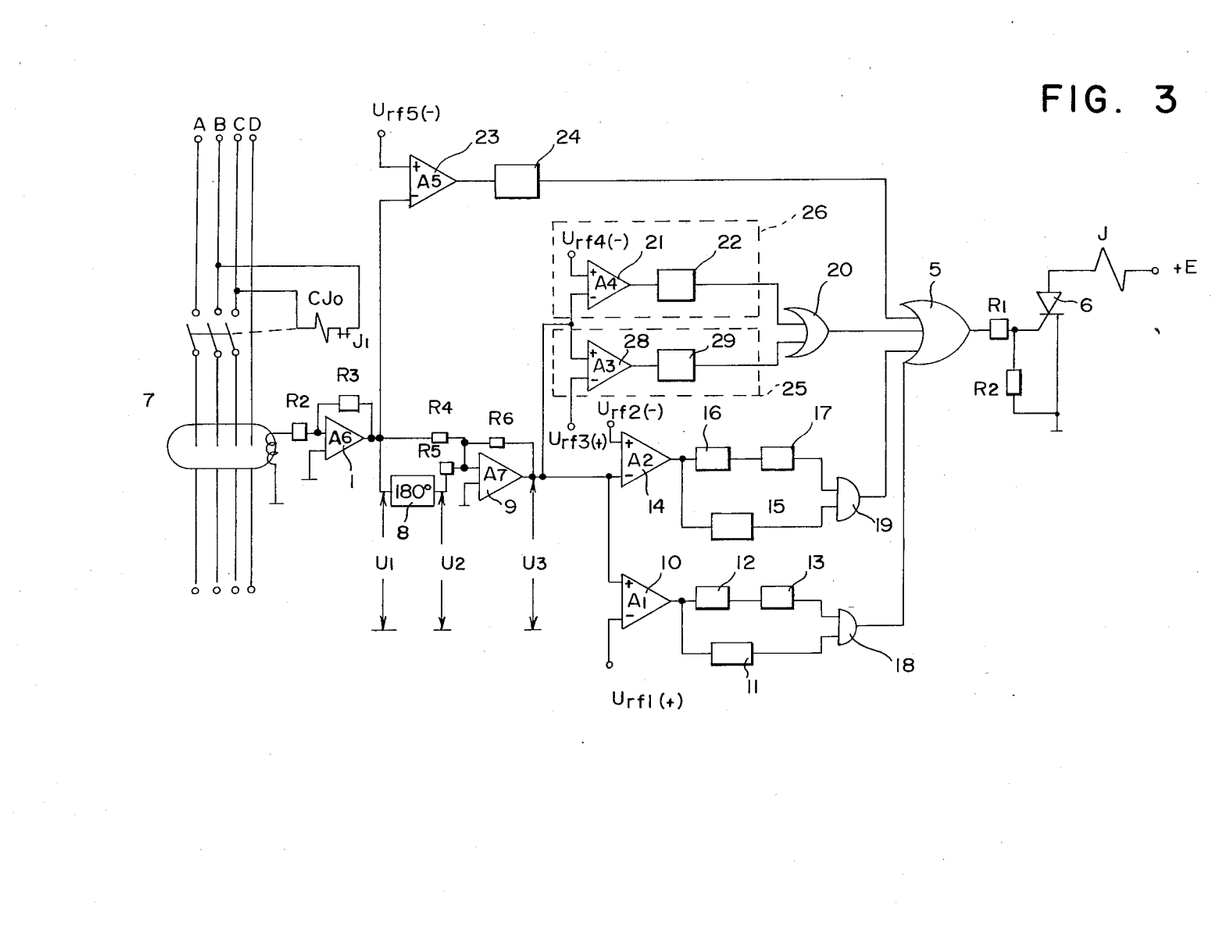
FIG. 3 shows a schematic block diagram of the second embodiment of the invention.
Figure 5:
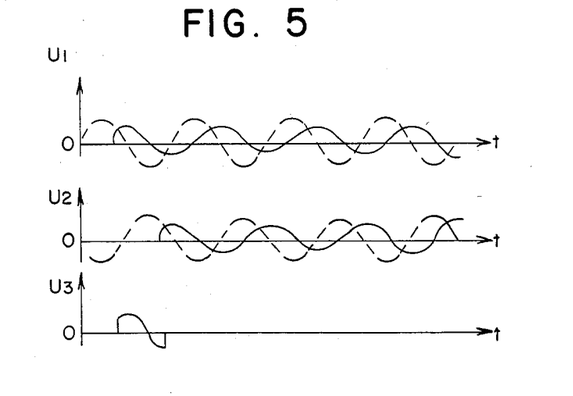
FIG. 5 shows the waveform of $U_1$–$U_3$ for the abrupt change of leakage current.

Referring to FIG. 3 and FIG. 5 in the protector apparatus according to the invention, means for producing positive leakage abrupt change operation signal 25 and means for producing negative leakage abrupt change operation signal 26 and a third OR gate 20 can be also provided after filter 2. When the abrupt change of the leakage current is large, the protector apparatus according to the invention can also interrupt the power supply. Although the frequency of the abrupt change current is the same as that of the power supply, in the filter 2 the abrupt change can not be cancelled out completely. A signal still appears at the output FIG. 5 shown the waveform of $U_1-U_3$ when the abrupt change component of the leakage current has a certain phase difference with the original leakage current. In the waveform of the $U_1$ the dotted line signal having a high amplitude is an original signal. It can be cancelled out by phase-shifting and addition. The signal having low amplitude in the abrupt change component, after phase-shift and addition, only the signal in the front half-cycle ($U_3$) remains. In the figure, the waveform is at first positive and then negative, and the waveform relates to the phase difference at the abrupt change. When the abrupt change of the leakage current is a positive abrupt change, then means for producing positive leakage abrupt change operation signal 25 operates. The means for producing positive abrupt leakage change operation signal 25 comprises a third comparator 28, and a third differential circuit 29. When the abrupt change of the voltage $U_3$ is greater than the third reference voltage $U_{rf3}$ the third comparator 20 operates and a positive square wave is output. The front edge of the square wave differentiates through the third differential circuit 29 and a positive pulse is obtained. This pulse operates the solid state switch 6 through the second OR logic gate 20 and the OR logic gate 5 so that the power supply is disconnected. If the abrupt change of the leakage current is a negative abrupt change, means for producing negative leakage abrupt change operation signal 26 is operated. Means 26 comprises a fourth comparator 21, and a fourth differential circuit 22. When the abrupt change in the negative direction is greater that the absolute value of $U_{rf4}$ (a negative voltage) the absolute output of the fourth comparator 21 is a square wave, the front edge of which is differentiated through the fourth differential circuit 22 and a positive pulse is obtained. The pulse is fed to the solid state switch 6 through the above-mentioned second OR logic gate 20 and the OR logic gate 5, so the solid state switch 6 turns into a diconductive state. The power supply is then disconnected. The third reference voltage $U_{rf3}$ and the fourth reference voltage $U_{rf4}$ should be chosen such that when the abrupt change of the leakage current is e.g. 40-60 ma the protector apparatus according to the invention is operated. The means for producing the leakage abrupt operation signal responds to the increment of the abrupt change of the leakage current only and not to the resultant leakage signal, so the abrupt change of the leakage current of the electric equipment itself can be reflected truly.

Referring to FIG. 3, means for producing the leakage operation signal can be also provided in the protector apparatus according to the invention. The input terminal of the means for producing the leakage operation signal is connected to the output of the amplifier 1 and the output of this means is connected to the OR logic gate 5. This means comprises a fifth comparator 23 and a fifth differential circuit 24. The fifth reference voltage $U_{rf5}$ (negative voltage) is fed to the positive input terminal of the fifth comparator 23, and the output of the amplifier 1 is connected to the negative input terminal of the fifth comparator 23. Thus when the amplitude of the leakage current is greater than the predetermined value in the negative half-cycle, in that $U_1$ is less than $U_{rf5}$, the fifth comparator 23 is operated, outputting a square wave. The front edge of the square wave is differentiated through the fifth differential circuit 24 and a positive pulse is obtained. The positive pulse is fed to the solid state switch 6 through the OR logic gate 5 and operates the switch 6, so that the power supply is disconnected. By the selection of the value of the voltage $U_{rf5}$ the protector apparatus can be operated when the leakage current with respect to ground is e.g. 200 ma. Furthermore, $U_1$ may be fed to the positive input terminal of the fifth comparator 23, and the reference voltage $U_{rf5}$ (at this time a positive voltage is adopted) is fed to the negative input terminal.

Referring to FIG. 6, the upper waveform is a waveform of the general electric shock current in which the rise time is slow and the lower waveform is the waveform of the power supply for reference.

Figure 7:
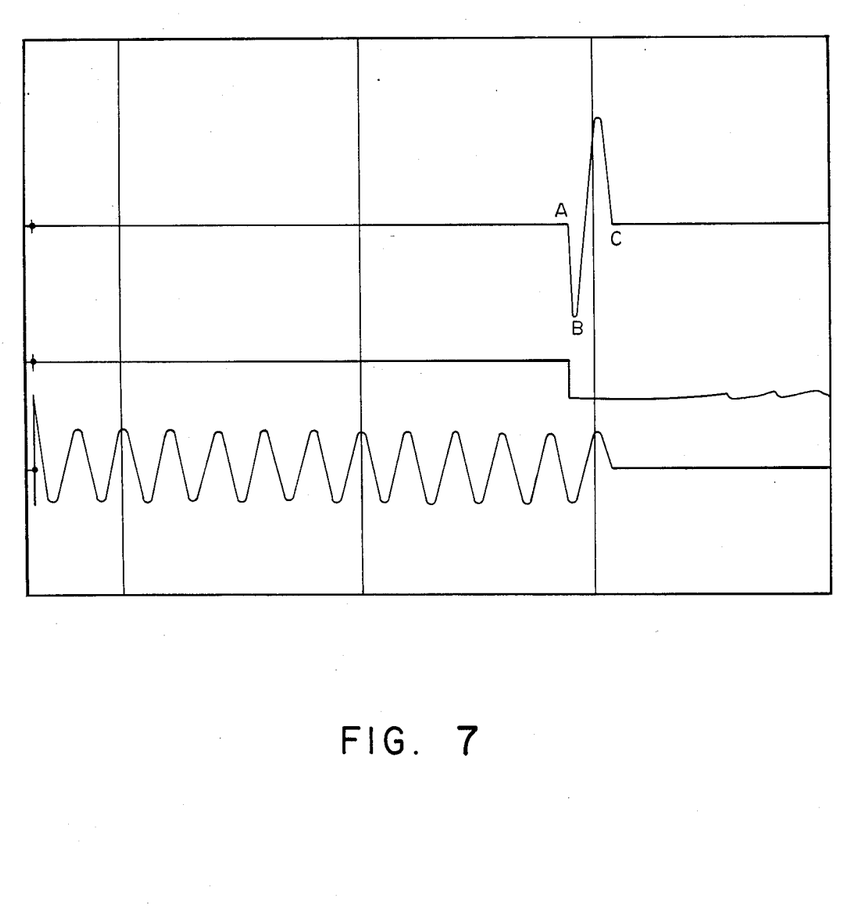
FIG. 7 shows the waveform of the current and the voltage occurring when the protector operates at the direct electric shock.

FIG. 7 shows the waveform recorded in the experiment of the direct electric shock with a rabbit. The lower waveform in FIG. 7 is a waveform of the voltage of the power supply for reference, and is a waveform in 50 Hz. The upper waveform is a waveform of the electric shock current passing through a rabbit. It can be seen that the frequency of the electric shock current is higher than that of the power supply in FIG. 7. The anode voltage of the SCR 6 with respect to ground is recorded as the middle waveform. When the SCR is not operated, the anode voltage is at high potential, therefore the anode voltage is lowered when the SCR is operated. The abrupt swing downward in the middle waveform means that at that point (B point) the SCR 6 starts to operate due to the increase of the electric shock current. The electric shock starts at point A, and the power supply is disconnected completely at point C.

Figure 8A:
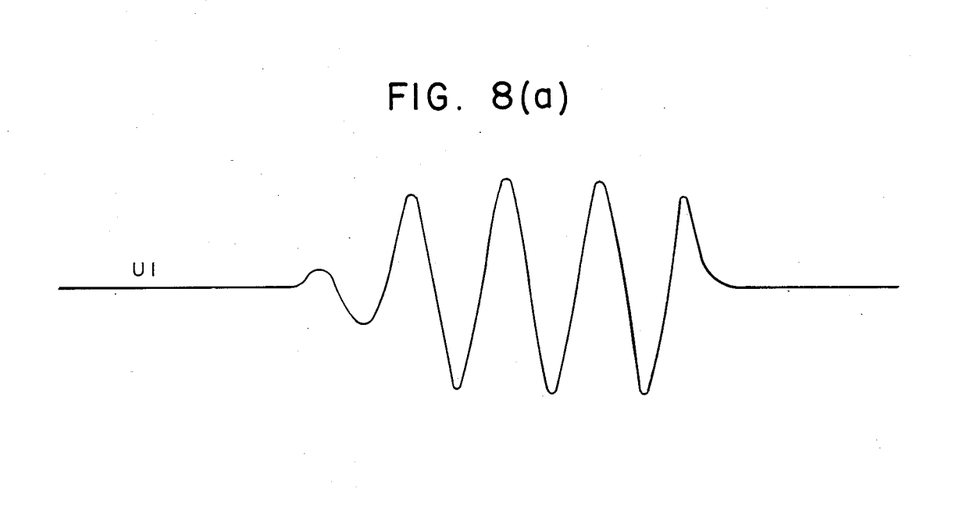
FIG. 8 shows the waveform occurring when the protector operates at the general electric shock.
Figure 8B:
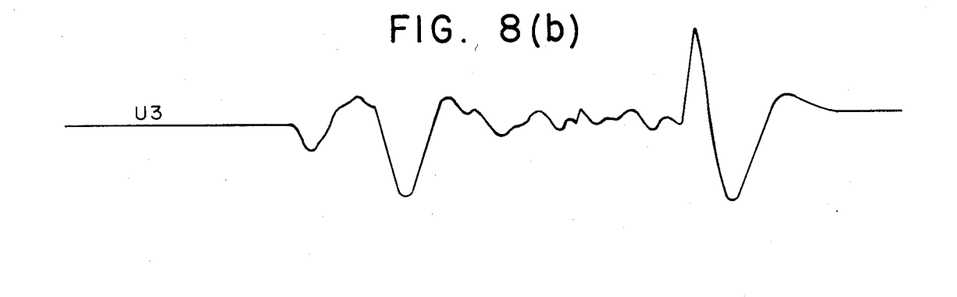
Figure 8C:
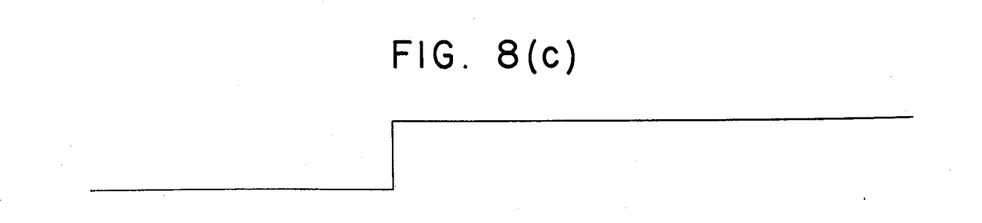

FIG. 8 shows the waveform recorded when the protection is activated at a general electric shock, wherein (a) is the waveform of the voltage $U_1$, (b) is the waveform of the voltage $U_3$ and (c) is the waveform of the voltage at the anode of the SCR 6.

Referring to FIG. 3, in the protector apparatus according to the invention, the comparator, amplifier, and adder can use an operational amplifier, at the output terminal of which a capacitor for separation of the direct current may be connected in series when needed. As for the differential circuit a positive pulse is produced at the front edge of the square wave, and a negative pulse is also produced t the rear edge of the square wave. In order that the gate circuit after the differential circuit will not be destroyed, a parallel diode (not shown) can be connected for the absorption of the negative pulse.

While the preferred embodiments of the invention have been shown and described, it will be apparent to those skilled in the art that changes can be made in the embodiment without departing from the principles of the invention, the scope of which is defined in the appended claims.

I claim:

1. An electric shock protector apparatus comprising:
   a. separatable contacts connecting a power source to power lines;
   b. means for separating said contacts to disconnect said power source from said power lines;
   c. means for detecting a current passing through said contacts and outputting a voltage representative thereof;
   d. means for amplifying the output voltage of said means for detecting;
   e. means for adding the amplified output voltage to a phase-shifted voltage formed from said amplified output voltage after a 180° phase shift;
   f. means for producing a positive half-cycle electric shock operation signal in response to the output of said means for adding occurring as a result of a human or animal coming into contact with said power lines;
   g. means for producing a negative half-cycle electric shock operation signal in response to the output of said means for adding occurring as a result of a human or animal coming into contact with said power lines; and
   h. an OR logic gate having a first input terminal connected to receive said positive half-cycle electric operation signal, a second input terminal connected to receive said negative half-cycle electric shock operation signal and an output terminal connected to said means for separating;
   whereby when said current is an electric shock current having a frequency higher than a frequency of said power source, said means for separating said contacts is operated to interrupt the power supply.

2. The protector apparatus according to claim 1, wherein said means for adding comprises:
   a. a phase shifter with a 180° phase shift for the frequency of said power source and having an input terminal connected to the output of said means for amplifying and an output terminal; and
   b. an adder amplifier having a first input terminal connected to the output of said means for amplifying, and a second input terminal connected to said output terminal of said phase shifter.

3. A protector apparatus according to claim 1, wherein said means for producing a positive half-cycle electric shock operation signal includes a first comparator, a first integrator circuit, a first differential circuit, a first monostable trigger, and a first AND logic gate.

4. A protector apparatus according to claim 3, wherein said means for producing a negative half cycle electric shock operation signal includes a second comparator, a second integrator circuit, a second differential circuit, a second monostable trigger, and a second AND logic gate.

5. A protector apparatus according to claim 1, further comprising means for producing a positive leakage abrupt change operation signal, means for producing a negative leakage abrupt change operation signal, and a second OR logic gate.

6. A protector apparatus according to claim 5, wherein said means for producing a leakage abrupt change operation signal includes a comparator and a differential circuit.

7. A protector apparatus according to claim 1, further comprising means for producing a leakage current operation signal.

8. A protector apparatus according to claim 7 wherein said means for producing a leakage operation signal includes a comparator and a differential circuit.

9. A protector apparatus according to claim 1, wherein said means for detecting the current passing through said contacts comprises a current transformer.

10. The protector apparatus according to claim 1, wherein said means for adding comprises:
    a. a phase-shift amplifier comprising a phase shifting circuit and an amplifier with a 180° phase shift for the frequency of said power source and a gain of substantially 1, having an input terminal connected to the output of said means for amplifying and an output terminal, and
    b. an adder amplifier having a first input terminal connected to the output of said means for amplifying and a second input terminal connected to said output terminal of said phase shifting amplifier.

11. An electric shock protector apparatus comprising:
    a. separatable contacts connecting a power source to power lines;
    b. means for separating said contacts to disconnect said power source from said power lines;
    c. means for detecting a current passing through said contacts and outputting a voltage representative thereof;
    d. means for amplifying the output voltage of said means for detecting;
    e. means for adding the amplified output voltage to a phase-shifted voltage formed from said amplified output voltage after a 180° phase shift;
    f. means for producing a positive leakage abrupt change operation signal in response to the output of said means for adding occurring from a positive leakage current abrupt change;
    g. means for producing a negative leakage abrupt change operation signal in response to the output of said means for adding occurring from a negative leakage current abrupt change; and
    h. an OR logic gate having a first input terminal connected to receive said positive leakage abrupt change operation signal, a second input terminal connected to receive said negative leakage abrupt change operation signal and an output terminal connected to said means for separating;
    whereby when said current is a leakage abrupt change current or an abrupt change of an electric shock current having a frequency higher than a frequency of said power source, said means for separating said contact is operated to interrupt the power supply.

* * * * *